United States Patent
Cirelli et al.

[11] Patent Number: 5,926,754
[45] Date of Patent: Jul. 20, 1999

[54] DIRECTORY ASSISTANCE CALL PROCESSING SYSTEMS AND RELATED METHODS

[75] Inventors: Daniel A. Cirelli; Vince Scott Margiotta, both of Long Valley, N.J.

[73] Assignee: AT&T Corporation, Middletown, N.J.

[21] Appl. No.: 08/576,733

[22] Filed: Dec. 21, 1995

[51] Int. Cl.⁶ .............................. H04Q 7/20; H04Q 7/38
[52] U.S. Cl. .................... 455/414; 455/412; 455/406; 455/407; 455/408; 455/403
[58] Field of Search ................... 379/58, 59, 61, 379/67, 70, 88, 201, 211; 455/33.1, 31.1, 407, 414, 403, 412, 406, 408, 413, 422

[56] References Cited

U.S. PATENT DOCUMENTS

| | | | |
|---|---|---|---|
| 5,329,578 | 7/1994 | Brennan et al. | 379/67 |
| 5,339,352 | 8/1994 | Armstron et al. | 379/58 |
| 5,450,476 | 9/1995 | D'Apuzzo et al. | 379/67 |
| 5,473,671 | 12/1995 | Partridge, III | 379/59 |
| 5,509,049 | 4/1996 | Peterson | 379/58 |
| 5,579,379 | 11/1996 | D'Amico et al. | 455/407 |
| 5,613,006 | 3/1997 | Reese | 379/67 |

*Primary Examiner*—Wellington Chin
*Assistant Examiner*—Keith Ferguson

[57] ABSTRACT

In a telecommunications switching system, after a non-published listing has been located in response to a request from a calling customer station and after the calling customer has been qualified, a connection is set up between the calling customer station and a customer station identified by the listing. Qualified callers are those callers who satisfy at least one specified condition or criterion. Illustratively, the condition specified may be that the call must be placed from a telephone located within a geographic region from which the customer station identified by the listing is willing to accept calls. Alternatively, where the customer station identified by the listing is a cellular telephone, the condition may be that the calling customer accepts all charges associated with the cellular communication link. The directory assistance call is completed without announcing the non-published number to the calling customer.

10 Claims, 3 Drawing Sheets

DIRECTORY ASSISTANCE CALL PROCESSING SYSTEMS AND RELATED METHODS

TECHNICAL FIELD

This invention relates to telecommunications operator service systems and, more particularly, to systems and methods for the completion of directory assisted calls.

BACKGROUND OF THE INVENTION

Many modern directory assistance systems use a computer aided directory assistance search arrangement. In such systems, when an operator has found an apparently correct listing, the operator signals the identity of the correct listing and the listing is then automatically announced to the calling telephone customer. At the calling party's option, a connection is then set up between the calling customer station and a customer station identified by the listing.

A problem encountered in offering directory assistance service is that callers can only reach customers with non-published numbers by persuading a directory assistance supervisor that an emergency exists. Even in the absence of an emergency, however, certain classes of customers with an unpublished number might, under certain circumstances, be receptive to receiving directory assisted calls. By way of illustration, the election of a cellular telephone subscriber to have a non-published number is typically motivated less out of a concern for privacy than as a simple expedient to avoid the air-time charges for which he or she will be billed when receiving such calls. Other customers, such as those who have just relocated to a new city and state, may be willing to accept calls from certain calling areas—such as those in the vicinity of the customer's past and present residence, as indicated by the area code of the calling party, for example—with the assumption that calls from any other area are from solicitors and other parties with whom the customer does not wish to speak.

SUMMARY OF THE INVENTION

The above problem is solved and advance is made in the art in accordance with the present invention wherein in a telecommunications switching system, after a non-published listing has been located in response to a request from a calling customer station and after the calling customer has been qualified, a connection is set up between the calling customer station and a customer station identified by the listing. Qualified callers are those callers who satisfy at least one specified condition or criterion.

Illustratively, the condition specified may be that the call must be placed from a telephone located within a geographic region from which the customer station identified by the listing is willing to accept calls. Alternatively, where the customer station identified by the listing is a cellular telephone, the condition may be that the calling customer accepts all charges associated with the cellular communication link. The objectives of the non-published customer are preserved by completing the directory assistance call without announcing the non-published number to the calling customer.

BRIEF DESCRIPTION OF THE DRAWINGS

The advantages and principles of the invention will be better understood by reference to the detailed description set forth herein and to the accompanying drawings, which are incorporated in and constitute a part of this specification, wherein.

DETAILED DESCRIPTION

Figure 1:
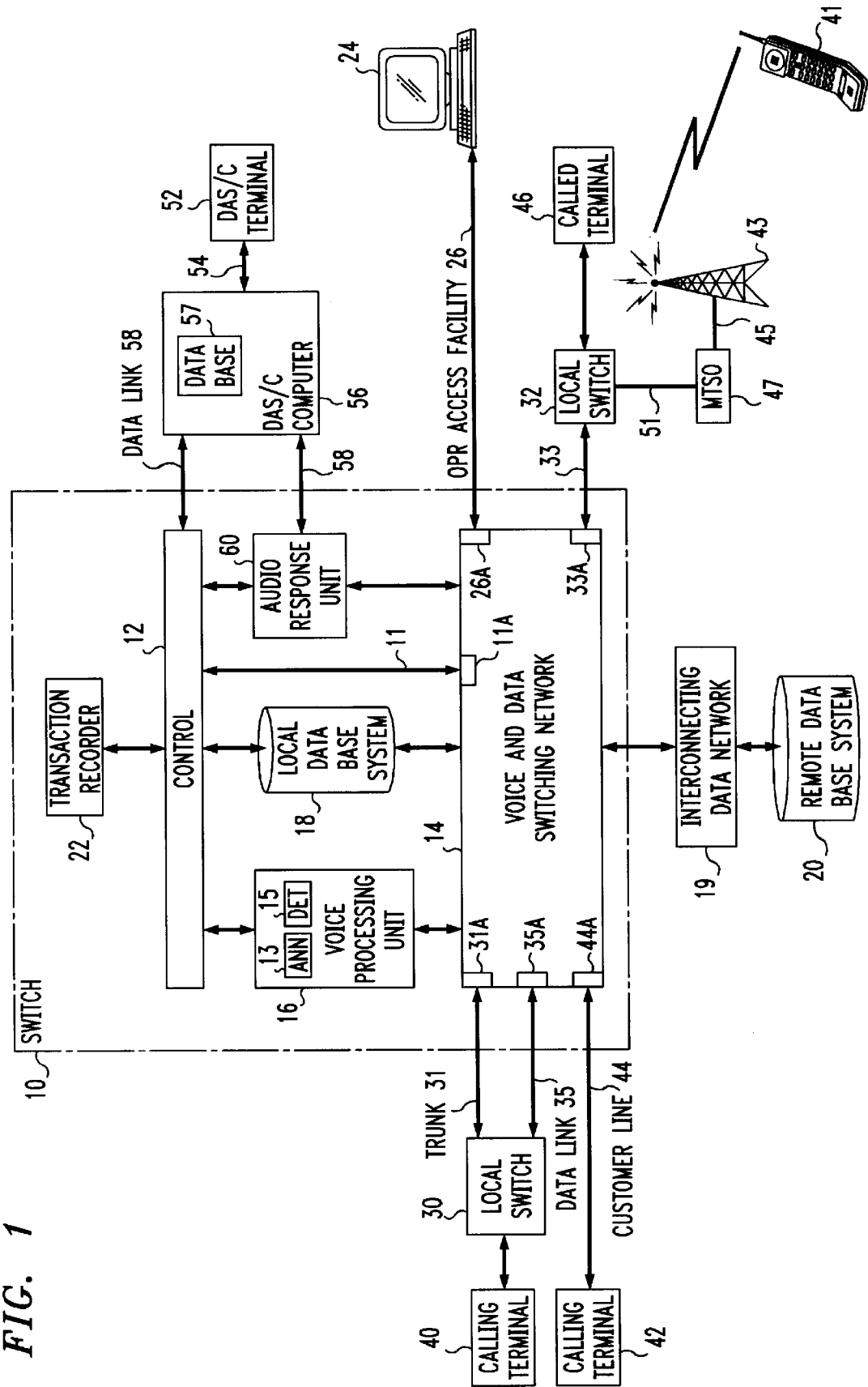
FIG. 1 is a block diagram of a telecommunications switch and auxiliary facilities adapted to offer directory assistance service in accordance with an illustrative embodiment of the present invention.

In FIG. 1, block 10 represents a telecommunications switching system or switch operating under stored program control and having within it the elements necessary for practicing the invention. Switch 10 is a switch such, for example, as the 5ESS TM switch manufactured by AT&T Corp., arranged to offer the Operator Services Position System (OSPS) features. The 5ESS switch is described, for example, in AT&T TECHNICAL JOURNAL, v. 64, no. 6, part 2, pp. 1305–1564, and the OSPS feature is described, for example, in Paper 3, Session 22C presented at the International Switching Symposium in Florence, May 1984.

Within switch 10 are various blocks for carrying out the functions of a telecommunications switch. Control 12 is a distributed control system operating under the control of a group of data and call processing programs to control various blocks of the switch. In order to practice the present invention for directory assistance systems, the operator services control programs are augmented by programs such, for example, as the one depicted in flow diagram of FIG. 3 and described hereinbelow. Block 14 is a voice and data switching network capable of switching voice and/or data between inputs connected to the switching network. Connected to the network 14 is voice processing unit 16. Input communication links to the switching network are connected at input ports identified by the number of the connected input with the letter "a" appended.

Unit 16 receives a non-supervisory input signal which, in the illustrative embodiment of FIG. 1, may be either voice or a dual tone multifrequency (DTMF) signal from a calling terminal and analyzes such signals to distinguish among the various allowable DTMF signals and among the individual elements of a predetermined list of spoken responses. Unit 16 also generates tones and voice messages to prompt a customer to speak or key information into the system for subsequent recognition by the voice processing unit. Unit 16 generates an output data signal, representing the result of the voice processing; this output signal is sent to control 12 and is used as an input to the program for controlling establishment of connections in switching network 14 and for generating displays for operator position 24. Voice processing unit 14 includes announcement circuits 13 and detection circuits 15 both controlled by a controller of voice processing unit 16. In alternate configurations, the announcement and detection circuits could be separate and separately controlled. The Conversant 1 Voice System, Model 80, manufactured by AT&T Corp., is one unit which can be used to carry out the functions of voice processing unit 16.

Data base systems 18 and 20 are used by switch 10 in order to control calls. Local data base system 18 is directly accessible by control 12 and accessible via switching network 14. Remote data base system 20 is accessible to control 12 via switching network 14 and an interconnecting data network 19. Remote data base system 20 is typically used for storing data that is shared by many switches. For example, a remote data base system might store data pertaining to customers for a region; the particular remote data base system that is accessed via data network 19 would be selected to be the remote data base system associated with the region of the called terminal. Interconnecting data network 19 can be any well known data network and specifically could be a network for a common channel signaling system such as the international standard telecommunications signaling system SS 7.

Connected to switch 10 are trunks 31 and 33 connected to local switches 30 and 32. These local switches 30 and 32 are connected to calling customer terminal 40 and called customer terminal 46, respectively, for connecting customer station signals between customer terminals and switch 10. Also exemplified by connection to switch 10 as a called customer terminal is cellular telephone 41. In a conventional manner, two way wireless communication is achieved between cellular telephone 41 and one of the cell site antennas 43 of a cellular network operating within the LATA. A trunk circuit 45 connects cell site antenna 43 to a mobile telephone switching office (MTSO) 47. The MTSO 47 is typically a program controlled telephone switch set up for processing cellular telephone calls such, for example, as an AUTOPLEX 1000 switch manufactured by AT&T Corp. In a conventional manner, the MTSO 47 provides switched communications between communication circuits on the trunk 45 and the landline telephone network 14. Typically, the MTSO will connect via trunk circuits to one or more local or tandem offices of the local public switched telephone network, as exemplified by the connection of MTSO 47 to local switch 32 by trunk circuit 51. Additionally, the MTSO may connect to the point of presence of one or more Interexchange Carriers (IXC's).

Also connected to switch 10 are customer lines, including customer line 44, for connecting a customer terminal 42 to switch 10. The word "terminal" as used herein includes a simple customer telephone station, a customer station with more elaborate features such, for example, as a magnetic strip card reader, a cellular telephone, or a customer voice/data terminal. In an exemplary connection, calling terminal 40 is connected via local switch 30 to switch 10. In a more general case, other switches forming part of a larger public telephone network would be required to connect calling terminal 40 to switch 10. Calls are connected to switch 10 via communication links such as trunks 31, 33 and customer line 44. In this example, calling terminal 40 is connected by a customer line to a 1A SSTM TM switch 30, manufactured by AT&T Corp., and used here as a local switch, and that switch is connected to trunk 31 which is connected to switch 10.

Local switch 30 is also connected to switch 10 by a data link 35 used for conveying common channel signaling messages between these two switches. Such common channel signaling messages may be used to request switch 30 to initiate the setting up of a connection, for example, between customer terminals 40 and 46. Switch 10 is connected in the example connection to called terminal 46 via local switch 32. Again, in a more general case, other switches forming part of a larger public telephone network would be required to connect called terminal 46 to switch 10. If the calling terminal is not directly connected to switch 10, the directory number of the calling terminal, identified, for example, by automatic number identification, is transmitted from the switch connected to the calling terminal to switch 10.

Operator position terminal 24 connected to switch 10 comprises a terminal for use by an operator in order to control operator assistance calls. Data displays for the operator position terminal 24 are generated by control 12. Operator position terminal 24 is connected to switching network 14 by operator access facility 26, which may include carrier facilities to allow the operator position to be located far from switching network 14 or may be a simple voice and data access facility if the operator positions are located close to the switching network. Only one operator position including the two terminals 24 and 52 is shown in FIG. 1 but it is understood that a typical switch, arranged to offer operator assistance services, has access to a large number of such operator positions.

In order to handle directory assistance service in accordance with the present invention, the system is further augmented by a directory assistance computer (DAS/C) 56 and a DAS/C terminal 52. The directory assistance operator has access to two separate operator terminals: terminal 24 previously described and terminal 52 used for communicating via data link 54 with DAS/C computer 56. The DAS/C computer has an extensive data base 57 and is used for making the searches required to be responsive to directory assistance requests. The DAS/C computer is connected via data link 58 to an audio response unit (ARU) 60 which is connected to the voice and data switching network 14. A typical DAS/C computer is manufactured by Computer Consoles, Inc. (CCI) who also manufactures an audio response unit and a DAS/C terminal. The DAS/C computer includes a data base 57 used for finding directory number listings for customers served by that DAS/C. DAS/C computer 56 is directly connected to control 12 by data link 59.

In an alternative embodiment, terminals 24 and 52 are a single terminal and the DAS/C computer is accessed via the operator access facility 26 and network 14, and the audio response unit (ARU) 60, which is combined with voice processing unit 16, is accessed by DAS/C via network 14. Trunks 31 and 33, customer line 44, data link 35, and operator access facility 26 are connected to network 14 at input ports 31a, 33a, 44a, 35a, and 26a respectively, and control 12 is connected via channel 11 at input port 11a. Voice processing unit 16 of FIG. 1 is used for the detection of customer commands but not for the purpose of announcing directory numbers. This is done for convenience since an existing system is available using a DAS/C computer and an associated audio response unit 60. A voice processing system such as the previously mentioned Conversant system can perform both the monitoring and the announcement functions so that in an alternative configuration, units 60 and 16 of FIG. 1 are merged into a single voice processing system. As shown, however, unit 16 comprises announcement circuits 13 for making prompting or other announcements to the customer.

The operator at terminals 24 and 52 communicates orally with a customer and on the basis of these communications keys information into the DAS/C terminal 52 for transmission to the DAS/C computer 56. The DAS/C computer 56 responds to such keyed information by generating displays of information on DAS/C terminal 52 which information may include the desired directory number. Illustratively, directory assistance service for local and remote numbers may be provided from a local source. In that regard, interconnecting data network 18 may be configured to access a remote data base system 20 in case the directory assistance request is for a number in another region not served by the data base of DAS/C computer 56. Such an arrangement simplifies the process of subsequently connecting the calling customer to the terminal of the directory number retrieved by the directory assistance process, as described hereinafter with respect to FIG. 3.

Figure 2:
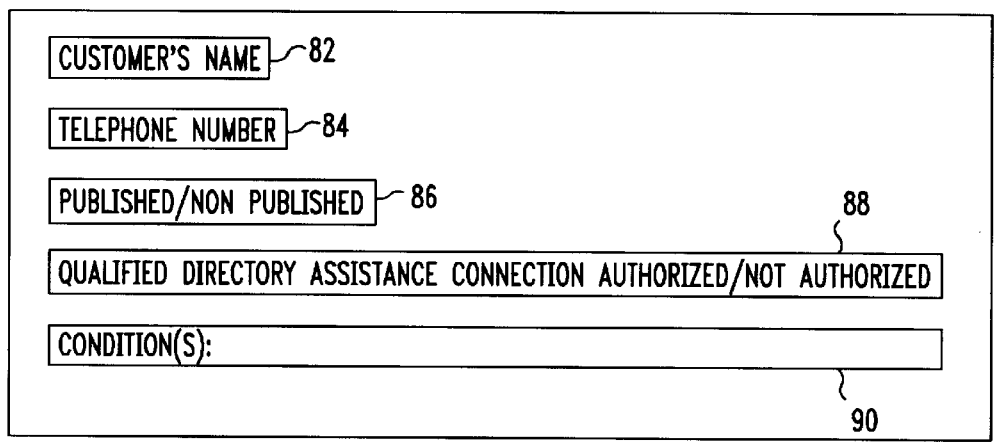
FIG. 2 depicts a sample customer record in accordance with one embodiment of the present invention.

In the illustrative embodiment of FIG. 1, a local database such, for example, as local database 18, stores customer records containing data about each telephone customer within a predefined geographic region. While various types of data can be stored about each customer in local database 18, FIG. 2 shows a preferred customer record 80, including exemplary data fields. As shown in FIG. 2, customer record 80 preferably includes the customer's name (field 82), customer's telephone number (field 84), an indication of whether the customer's telephone number is published (field 86), an indication of whether a non-published customer has authorized qualified connection service in accordance with the present invention (field 88), and, if applicable, identification of the specific criteria or condition(s) that must be satisfied before a call should be connected (field 90). By way of illustrative example, the identified customer is a cellular service subscriber and field 90 indicates a requirement that calls will only be accepted if the calling party is willing to pay all costs associated with the call, including the charge for the two-way wireless communication link. By way of additional example, however, field 90 may include an indication of a certain limited geographic calling region from which phone calls may be accepted.

If field 86 indicates that the customer's telephone number is published, or if it indicates that the number is non-published and in field 88 it is indicated that the customer has not authorized qualified connection, the operator signals to the DAS/C computer with additional keyed information to identify the correct listing and a directory number or a statement that the number is not published is then announced to the customer, as appropriate, through the audio response unit, the operator in the meantime being dropped from the connection.

The calling customer's own directory number or billing number has previously been transmitted over interconnecting network 30 using automatic number identification techniques to identify the calling terminal of a customer not served by switch 10, or obtaining the billing number of a customer served by switch 10 from the local data base 18. These numbers are used at the switch serving the customer or at switch 10 to record message accounting information for billing for the directory assistance call. In switch 10, transaction recorder 22 is used for making records to bill customers for directory assistance service, or, in accordance with an advance over the prior art, to bill the calling customer for the call set up in response to the customer's subsequent request to set up a call to the retrieved directory number. The call can be set up using the link from switch 10 back to calling customer terminal 40 and continuing the connection from switch 10 to called customer terminal 46 or called cellular terminal 41. Alternatively, a message can be sent back to switch 30 to set up a connection from switch 30 to called terminal 46 or called cellular terminal 41 using the normal route for a dialed call.

If in field 88 it is indicated that the customer has authorized qualified connection of callers utilizing directory assistance, qualification of the calling party in accordance with the criteria or condition(s) contained in field 90 is then performed. Such qualification may consist of nothing more than a comparison of the ANI of the calling customer to a list of area codes from which calls will be accepted. Alternatively, if the calling party utilizing calling terminal 40 is attempting to gain connection to the unpublished customer owning cellular telephone 41, an automated process may be performed during which the calling customer is supplied with voice prompts by audio response unit 60. Illustratively, the calling customer may be advised that although the called party has an unlisted number, a connection may still be made with the called party if he or she is willing to pay for the cost associated with the connection. If desired, a per-minute estimate of the cost of the desired wireless communication link may be announced to the calling customer at this time.

If an election is made by the customer to continue, as by a speech command or a tone generated by depression of the terminal keypad, the connection to the called terminal may be made immediately or, after additional prompting by audio response unit 60. For example, if the calling customer is utilizing a billing card or calling card to access the directory assistance service, the customer may be prompted to enter, as by telephone keypad or other expedient method, a credit card number, billing card number, or the like. In any event, the unpublished number of the called party is not announced to the calling party. As such, many objectives of the non-published customer such, for example as avoiding the expense associated with unnecessary and uninvited calls to his or her cellular telephone, and minimizing the possibility that incoming calls are from persons with whom the customer does not wish to speak, are achieved.

Figure 3:
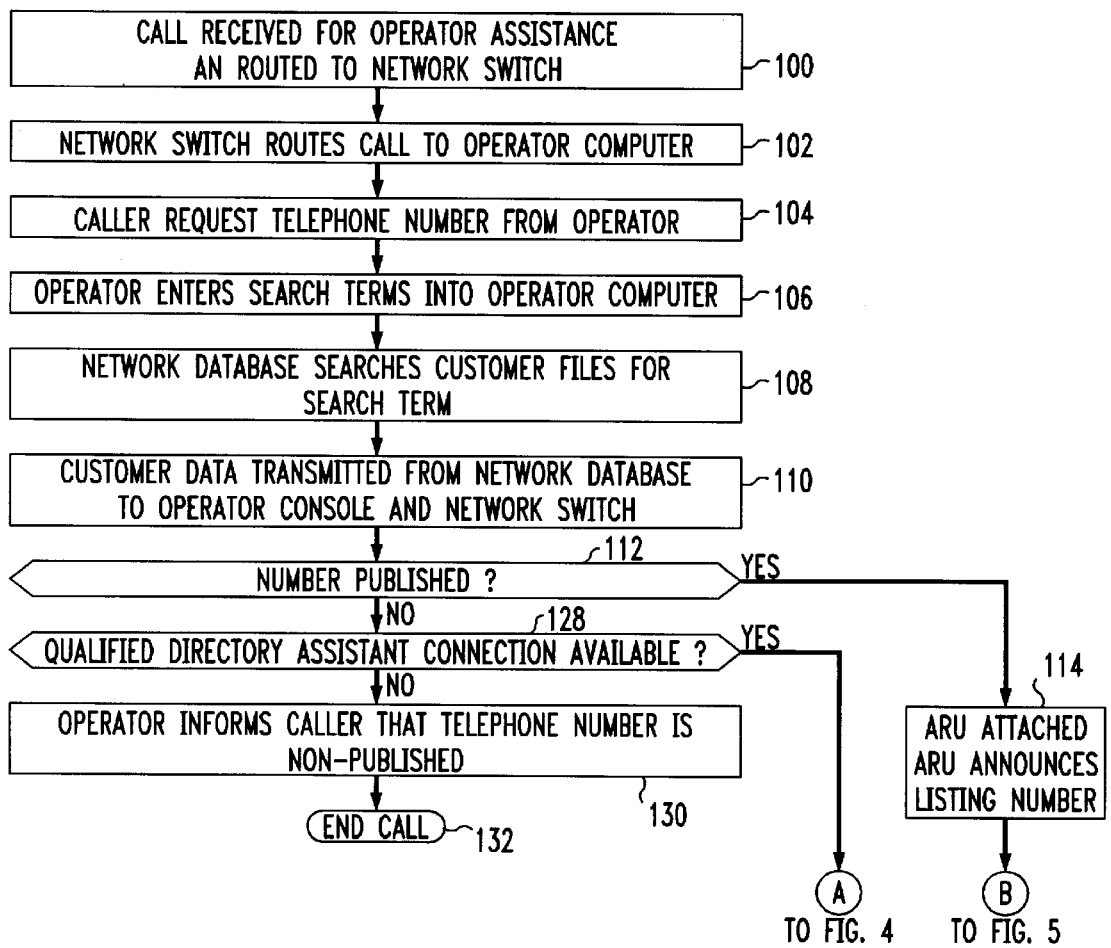
FIGS. 3–5 are flow diagrams showing how a call is processed in accordance with one embodiment of the present invention.
Figure 4:
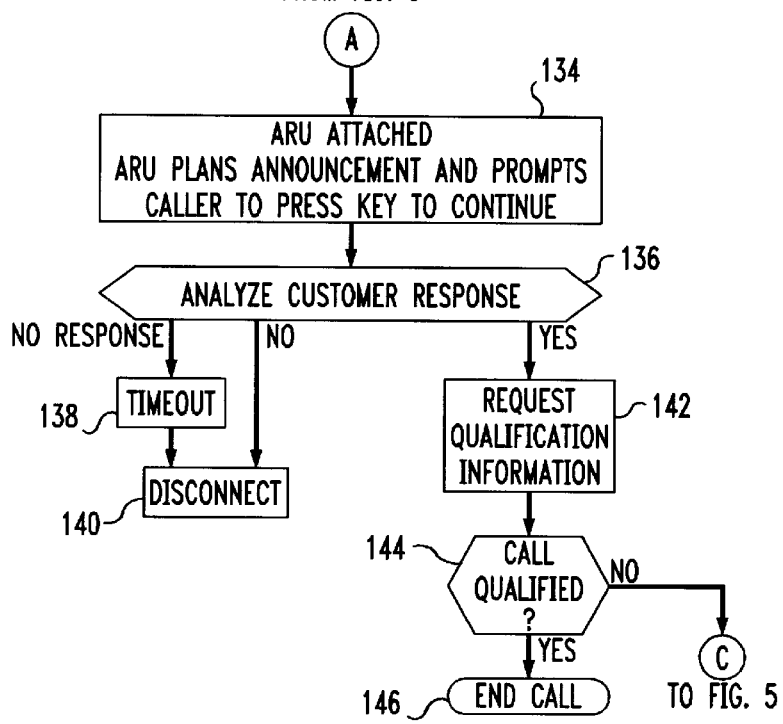
Figure 5:
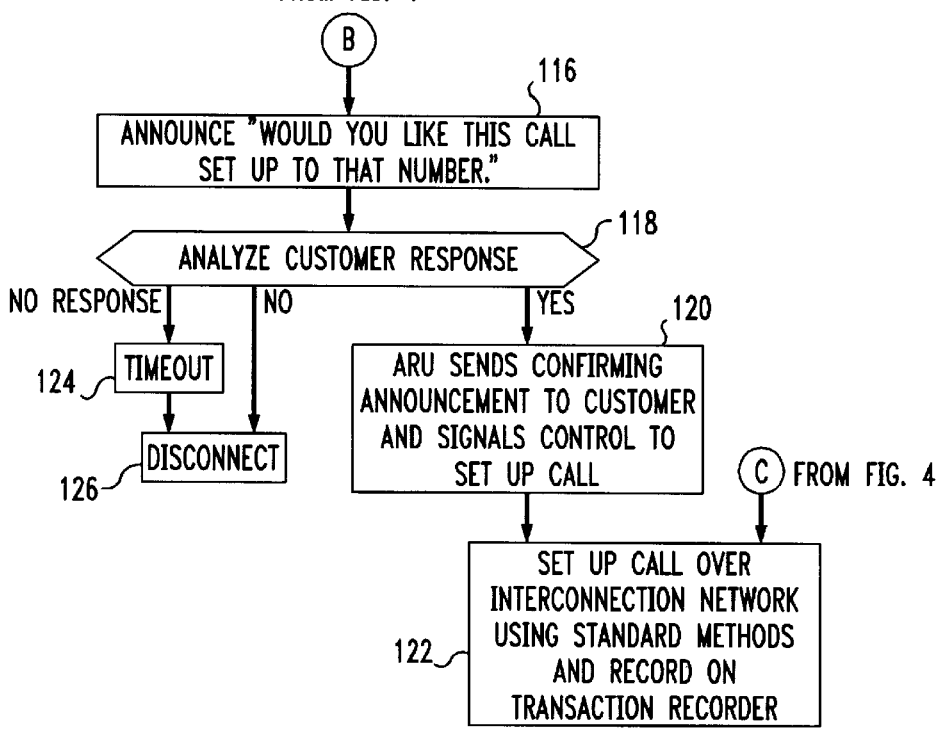

FIGS. 3–5 show how a call to a directory assistance service is processed in accordance with one embodiment of the present invention. When a call is placed from calling terminal 40 to directory assistance, local switch 30 receives the call and routes the call to network switch 10 (step 100). Upon receiving the call from local switch 30, network switch 10 routes the call to DAS/C computer or operator console 56 and establishes voice communication between a directory assistance operator at computer 56 and the caller (step 102).

The caller requests the telephone number of a party from a directory assistance operator at computer 56 (step 104). The operator enters search terms into the computer 56 and the search terms are transmitted, illustratively, to local network database 18 (step 106). Database 18 searches the customer records for a record containing a search term (step 108). When a match is found, the customer record is transmitted to computer 56 and to network switch 10 (step 110).

The process proceeds to decision step 112, wherein a determination is made as to whether the requested telephone number is published. If the requested number is published, operation proceeds in a conventional manner by connecting the caller to the audio response unit (ARU) 60 and by announcing the requested number (step 114). Accordingly, and as best shown in FIG. 5, the caller may be given the option of having the call set up for automatic connection (step 116). The caller's response is analyzed (step 118) and if the caller chooses automatic connection, a confirming announcement is made (step 120), the call is set up over interconnecting network 14 using standard methods, and the transaction is recorded on transaction recorder 22 (step 122). If the caller does not choose automatic connection, or fails to answer within a specified interval (step 124), the call is disconnected (step 126).

If, however, the requested number is non-published, network switch 10 determines whether the qualified directory assistance connection service of the present invention is available to the caller (step 128), as described in detail above. If the qualified connection service is not available to the caller, the operator informs the caller that the telephone number is non-published and hangs up (steps 130 and 132). If the qualified connection service is available to the caller, network switch 10 routes the call to ARU 60 (step 134). ARU 60 then plays an announcement to the caller describing, inter alia, specific qualification(s) required before a connection can be made in accordance with the qualified directory assistance connection service (step 134). In an illustrative embodiment in which the requested non-published number is associated with a cellular terminal, this announcement informs the caller that the requested telephone number of the cellular subscriber is non-published and explains that connection can still be made if the caller is willing to accept all charges for the call, including the wireless link charges that would normally be billed to the called terminal.

ARU 60 then prompts the caller to press a particular key to indicate that the caller would like to leave a message for the called party (step 134) and waits for the caller to press the key (step 136). If, after a selected interval, the caller does not press the appropriate key, or presses a key indicative of a negative response, the call is terminated (steps 138 and 140). If the caller presses the appropriate key, then the process proceeds to decision step 142, whereupon the calling customer is requested to provide, by way of illustrative example, a billing or credit card number and personal identification number so as to satisfy the exemplary condition of the calling party being willing to accept all charges associated with the communication link. The process then proceeds to decision step 144 whereupon if the calling customer fails to provide the requested information or to satisfy some other required condition, the call is terminated (block 146). If, however, the requested information is provided, a connection is made to the requested number (step 122).

It will, of course, be readily appreciated by those skilled in the art that conditions may be specified, for purposes of qualifying a caller before connection to a non-published number, that do not require any further interaction with the caller after the requested number has been identified. For example, where the party identified by the requested number has recently relocated from a given geographic region, he or she may be willing to accept directory assisted calls from that region for a limited time. In that event, using the ANI signal received from the local switch 30, DAS/C computer 56 may be programmed to process the connection in an automated fashion, for example, by comparing the area code of the calling party to an area code displayed in field 90.

Thus, while there has been illustrated and described what are at present considered to be an illustrative implementation and method of the present invention, it will be understood by those skilled in the art that various changes and modifications may be made, and equivalents may be substituted for elements thereof without departing from the true scope of the invention. In addition, many modifications may be made to adapt a particular element, technique or implementation to the teachings of the present invention without departing from the central scope of the invention. Therefore, it is intended that this invention not be limited to the particular embodiments and method disclosed herein, but that the invention include all embodiments falling within the scope of the appended claims.

What is claimed:

1. In a telecommunications network, a method of providing a directory assistance call completion service to a party having a published or non-published telephone number, comprising the steps of:

receiving a call from a calling party requesting directory service information corresponding to a called party the calling party desires to call;

accessing directory service information about the called party, said information including at least one of the called party's telephone number, an indication that the called party's telephone number is non-published, and information about conditions under which the called party authorizes a call connection from callers satisfying at least one specified condition; and if the called party's telephone number is non-published and the at least one condition is satisfied, initiating the establishment of a communication link between the calling party and the called party without announcing the called party's telephone number to the calling party.

2. The method of claim 1, further comprising a step of forwarding data identifying a calling terminal used by the calling party to an operator service system of the telecommunications network.

3. The method of claim 2, wherein said specified condition is a match between data identifying the calling terminal and a call origination area authorized by the called party.

4. The method of claim 2, further comprising a step of using the data identifying the calling terminal to form a billing record indicating that the calling party requested directory assistance call completion.

5. The method of claim 1, wherein the requested telephone number is non-published, the non-published number being associated with a wireless communication terminal.

6. The method of claim 5, wherein the at least one specified condition is that the calling party accept all charges associated with providing a wireless communication link established during said establishing step.

7. The method of claim 6, further including a step of announcing to the calling party that the number is non-published, and that a connection will only be made if the calling party is willing to pay for all costs associated with the call.

8. The method of claim 5, wherein the wireless communication terminal is a wireless telephone, further comprising:

forwarding data identifying a calling terminal used by the calling party to an operator service system of the telecommunications network;

using the data identifying the calling terminal to form a billing record indicating that the calling party requested directory assistance call completion;

receiving billing information for the wireless communication link from a mobile telephone switching office; and including charges for the call completion in the billing record formed for the calling party.

9. The method of claim 1, further including a step of initiating establishment of said received call if the requested telephone number is published.

10. A system for providing directory assistance call completion service to a party having a non-published telephone number for use with a telecommunications network, comprising:

means for receiving a call from a calling party requesting directory service information corresponding to a called party the calling party desires to call;

means for accessing directory service information about the called party, said information including at least one of the called party's telephone number, an indication that the called party's telephone number is non-published, and information about conditions under which the called party authorizes a call connection from callers satisfying at least one specified condition; and means for initiating the establishment of a communications link between the calling party and the called party, if the called party's telephone number is non-published and the least one condition is satisfied, without announcing the called party's telephone number to the calling party.

* * * * *